United States Patent

Wasserman

[15] 3,693,023
[45] Sept. 19, 1972

[54] ELECTRO-OPTICAL TACHOMETER
[72] Inventor: Seymour N. Wasserman, Natick, Mass.
[73] Assignee: Dynamics Research Corporation, Wilmington, Mass.
[22] Filed: Dec. 29, 1970
[21] Appl. No.: 102,326

[52] U.S. Cl. ............... 250/231 SE, 356/28, 73/231, 324/175, 250/233, 250/237, 250/239
[51] Int. Cl. ....... G01p 3/36, G01p 13/00, G01d 5/38
[58] Field of Search ...... 324/175; 250/231, 233, 237, 250/239; 356/28; 73/231

[56] References Cited

UNITED STATES PATENTS 3,421,012  1/1969  Johnson, Jr. ............... 250/233
3,166,624  1/1965  Vargady ............. 250/237 G X
3,400,275  9/1968  Trump ................ 250/231 SE Primary Examiner—Ronald L. Wibert
Assistant Examiner—R. J. Webster
Attorney—Weingarten, Maxham and Schurgin

[57] ABSTRACT

An electro-optical tachometer easily connected to apparatus the rotatable shaft of which is to be monitored and capable of providing an accurate output signal representative of shaft speed. A rotatable disc attached to the shaft to be monitored is cooperative with a stationary reticle to provide an interference pattern which is sensed by a plurality of photosensors which produce one or more output signals representative of the speed of the shaft and the rotational sense thereof.

5 Claims, 4 Drawing Figures

PATENTED SEP 19 1972

INVENTOR
SEYMOUR N. WASSERMAN
BY

ATTORNEYS

ELECTRO-OPTICAL TACHOMETER

FIELD OF THE INVENTION

This invention relates to electro-optical transducers and more particularly to an electro-optical tachometer for providing an electrical output signal representative of the velocity of a rotating shaft.

BACKGROUND OF THE INVENTION

In the control of the velocity of a rotating shaft it is necessary to determine with accuracy the velocity of the shaft in order to derive therefrom a control signal operative in a control loop for maintenance of velocity within a predetermined degree of accuracy. Such velocity control is widely employed for example in magnetic tape transport systems where a fine degree of speed control must be maintained in order to drive the tape at a predetermined rate at a high degree of accuracy. Heretofore velocity sensing has been accomplished by magnetic transducers in which a voltage is generated proportional to speed. However, these magnetic transducers provide limited accuracy by reason of the considerable ripple content in the output signal.

SUMMARY OF THE INVENTION

Briefly, the present invention provides a relatively simple and highly accurate electro-optical tachometer easily connected to a rotatable shaft the speed of which is to be monitored and capable of providing an output signal of low harmonic content which accurately represents the measured speed. A disc has formed thereon a track of alternately light responsive and non responsive sectors which typically are light transmissive and opaque. The disc cooperates with and is rotatable with respect to a reticle to provide an interference pattern which is sensed by a plurality of photosensors which produce one or more output signals representative of the speed of the disc relative to the stationary reticle. The output signal is of a frequency representative of speed and can be employed in a servo loop to control the speed of the rotating shaft to which the disc is affixed or can be employed to energize a suitable output indicator for display of speed information.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
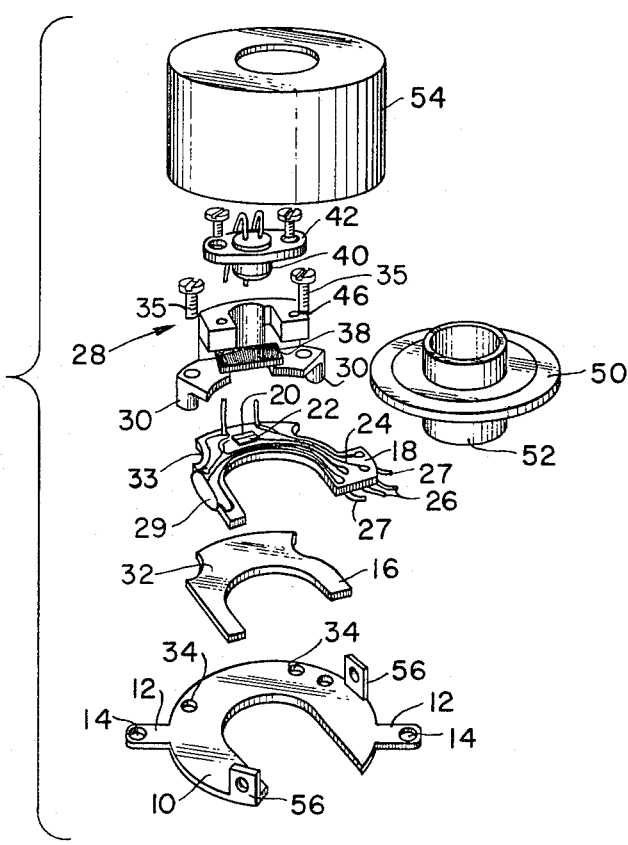
FIG. 1 is an exploded pictorial view of a tachometer according to the invention.
Figure 2:
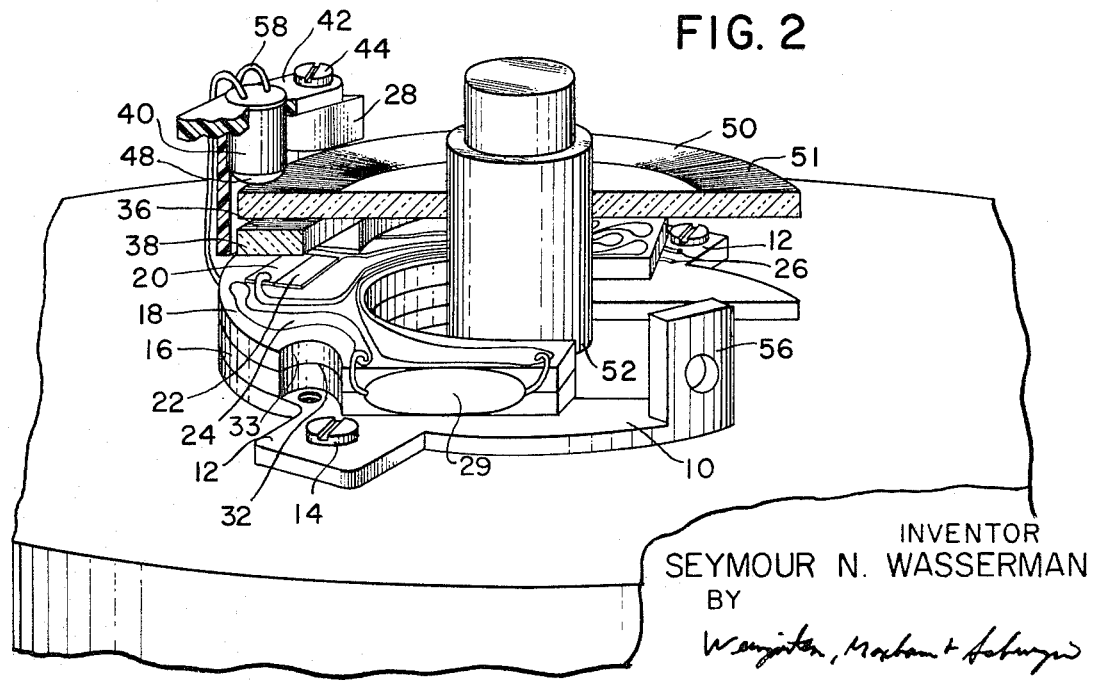
FIG. 2 is a cut-away pictorial view of a tachometer according to the invention.

The invention is typically embodied in a package which is easily installed on a motor or other instrumentality or device, the rotatable shaft of which is to be monitored. The electro-optical tachometer embodying the invention is illustrated in exploded view of FIG. 1 and in its assembled form in FIG. 2. A mounting plate 10 of generally U-shaped configuration includes flanges 12 having openings 14 therethrough for attaching plate 10 and the associated tachometer structure to a motor 11 or other device with which the invention is employed. An electrically insulative spacer 16 is disposed on a surface of mounting plate 10 and a similarly configured circuit board 18 is disposed on spacer 16. The circuit board 18 includes a pair of photosensitive elements 20 and 22 disposed as illustrated in side-by-side relationship. The photosensors 20 and 22 are interconnected via conductive paths 24 in back-to-back relationship, that is, in electrical phase opposition. The oppositely phased photosensors are coupled to a pair of output terminals 26 disposed at an end of the circuit board 18. It will be noted that the end of circuit board 18 from which the electrical terminals depend extends beyond the extremity of the underlying spacer 16 to provide space for electrical lead wire connection.

A reticle assembly 28 is disposed in association with circuit board 18 and is positioned with mounting portions 30 in alignment with curved portions 32 and 33 formed respectively in spacer 16 and circuit board 18 and attached to mounting plate 10 by fasteners 35 and threaded holes 34. The reticle pattern 36 formed on the upper surface of transparent plate 38 is thus accurately maintained in confronting relation to the photosensors 20 and 22. A light emitting diode 40 or other suitable illumination source is secured by means of a mounting flange 42 and fasteners 44 to a confronting mounting surface 46 of reticle assembly 28. The light emitting diode is disposed within a channel provided in the reticle assembly and when mounted has its lens 48 disposed adjacent the confronting surface of a ruled disc 50.

The lead wires 58 of the light emitting diode 40 are connected to respective conductive paths formed on circuit board 18 which terminate in terminals 27 at the end thereof to which lead wires are connected for application of an energizing potential to the light source. A current limiting-resistor 29 is connected in series with light emitting diode 40 to limit the current flowing therethrough.

The ruled disc is typically formed of glass and has formed around the periphery thereof an optical track 51 composed of alternately light transmissive and opaque equiangular sectors. The optical disc 50 is concentrically mounted on a hub 52 which includes means adapted for attaching the hub to an associated rotatable shaft. Disc 50 is disposed in operative association with the reticle pattern 36 which is identical to the pattern on disc 50 and is in alignment therewith such that upon rotation of disc 50 relative to the stationary reticle 38, an optical fringe or interference pattern is formed which can be sensed to provide an indication of the rotational speed of relative motion therebetween.

It will be appreciated that accurate alignment between the ruled disc 50 and associated reticle 38 must be maintained in order to provide effective and reliable tachometer operation. It is a feature of the invention that such alignment and superior performance is provided in a manner and by means which are extremely simple and yet highly accurate and reliable. The novel tachometer is easily assembled by stacking spacer 16 and circuit board 18 onto mounting plate 10, these components being accurately maintained in position by means of curved portions 32 which cooperate with mounting pedestals 30 of the reticle assembly 28. A pair of fasteners secures the entire stationary portion of the novel tachometer. The reticle 38 is disposed in proper alignment with light source 40 and is also maintained in proper alignment with photosensors 20 and 22 by means of the novel mounting arrangement provided.

In use, the hub 52 is secured to a rotatable shaft the speed of which is to be monitored, while the stationary portion of the tachometer is mounted via flanges 12 to a stationary member adjacent the rotatable shaft, with the reticle 38 in proper alignment with the ruled pattern on disc 50 to provide the intended interference pattern. In a typical operating environment, the tachometer is mounted to the case of an electric motor with the disc 50 attached to the motor shaft thereof. A cover 54 is provided around the transducer assembly and is secured to mounting plate 10 for example by upstanding flanges 56.

As described, the pattern 51 on disc 50 is formed with a plurality of equiangular opaque and light transmissive sectors. Typically, 500 light transmissive and opaque sectors are provided around the circumference of the disc. A like ruled pattern is formed as the reticle 36 on a surface of plate 38. The reticle pattern in aligned with respect to the cooperative pattern 51 on disc 50 with the reticle lines skewed by a predetermined amount with respective to the lines of pattern 51 to form the intended interference or fringe pattern. The formation of the optical interference pattern is per se well known in the optical encoder art and need not be described in detail herein. Briefly, with a ruled optical pattern and a like ruled pattern skewed therewith, relative movement between the two patterns causes the generation of a variable fringe pattern which varies in a direction orthogonal to the direction of movement of the ruled patterns. The variations in the interference pattern are representative of the degree of relative motion between the ruled patterns and are also representative of velocity.

In mounting the novel tachometer on a motor or other device, the disc 50 is mounted on the motor shaft by means of hub 52 and set screw 53. The stationary assembly is arranged in position on a mounting surface of the motor with the disc in position between reticle plate 38 and light source 40. A proper gap is maintained the confronting surfaces of reticle 38 and disc 50 and is initially provided by means of a shim which can be inserted therebetween while the tachometer is being installed. In order to provide the degree of skew with respect to the ruled pattern 51 formed on disc 50 and the like pattern 36 formed on reticle plate 38, the output terminals 26 can be connected to an oscilloscope and the light source 40 energized to provide a visual output on the oscilloscope screen which can be viewed as the disc 50 is manually rotated. With the mounting screws of the stationary assembly of the tachometer slightly loosened, this stationary assembly can be moved slightly within the hole clearance of the mounting holes 14 until a maximum output signal is observed on the oscilloscope screen as the disc is turned. At the position which provides maximum output, the mounting screws are tightened to fix the position of the stationary tachometer assembly, which can be further maintained in position by epoxy cement if desired.

As described above, the ruled pattern 51 formed around disc 50 cooperates with the reticle pattern 36 to provide, upon rotation of disc 50 with respect to the stationary reticle, an interference pattern the fringes of which move radially. The variation in light transmitted by reason of the modulating action of the interference pattern is sensed by photosensors 20 and 22 to provide an electrical output signal of generally triangular waveform. The photosensors are electrically connected in phase opposition and are operative to compensate for low frequency variations due to transmission variations in the disc.

Figure 3:
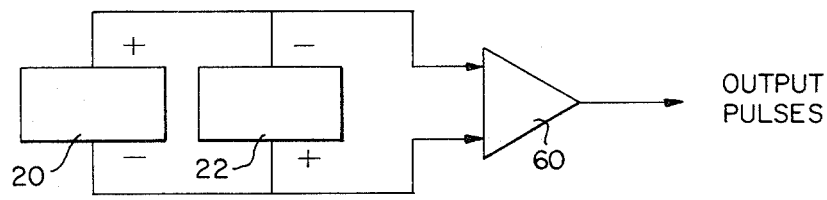
FIG. 3 is a block diagram of circuitry useful in practicing the invention.

The output signal provided at terminals 26 can be employed directly in a speed control loop or can be employed to drive suitable display apparatus for indication of speed. In some cases it is useful to provide a normalized output in the form of a pulse train which is of a frequency representative of speed, and in this case the photosensors 20 and 22 can be connected via terminals 26 to an amplifier/shaper 60 shown schematically in FIG. 3 which is operative to provide an amplified train of pulses of standardized height but of a frequency variable in accordance with the speed of disc 50 relative to stationary reticle 38. The amplifier/shaper 60 can be of integrated circuit form mounted integrally in the tachometer on circuit board 18. Additional output circuitry can also be integrally mounted on circuit board 18, which can be of extended diameter to accommodate such circuitry.

Figure 4:
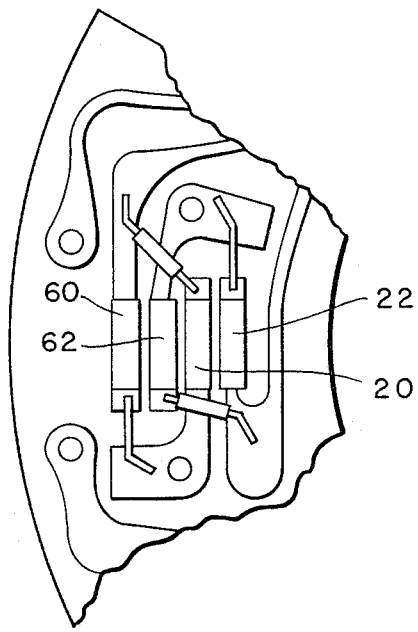
FIG. 4 is a cut-away pictorial view of an alternative embodiment of the invention.

In an alternative embodiment of the invention, illustrated in FIG. 4, an additional pair of photosensors 62 and 64 is radially arranged with respect to the first pair of photosensors 20 and 22 and is operative to provide a second output signal which is in phase quadrature with the first output signal and which can be employed to provide an indication of the sense of rotation of disc 50. The second pair of photosensors is connected in phase opposition similarly to the first pair of photosensors 20 and 22 and the output signal of this second photosensor pair can be employed in well known circuitry for providing rotational sense information.

While a preferred embodiment of the invention has been shown and described, it will be appreciated that modifications and alternative implementations will occur to those versed in the art without departing from the true scope of the invention. For example, a pattern of alternatively light reflective and opaque sectors can be employed on disc 50, with the light source provided on the same side of the disc as the reticle to produce the intended fringe pattern. Accordingly, it is not intended to limit the invention by what has been particularly shown and described except as indicated in the appended claims.

What is claimed is:

1. An electro-optical tachometer comprising:
   a transparent disc concentrically mounted on a hub and having around the periphery thereof a plurality of alternately light transmissive and opaque equiangular sectors defining an optical pattern;
   a generally U-shaped stationary assembly adapted for mounting around the rotatable shaft of a device the speed of which is to be monitored, said assembly including:
   a generally U-shaped mounting plate having means for mounting said stationary assembly on said device;

a spacer member of generally U-shaped configuration mounted on a surface of said mounting plate;

a circuit board of a configuration conforming to the configuration of said spacer member and mounted thereon and having a plurality of photosensors disposed on a surface thereof and connected via conductive paths formed on said circuit board to a plurality of output terminals thereon;

said spacer member and circuit board each having aligned corner portions;

a housing having a plurality of mounting posts attached to said mounting plate and configured to mate with said corner portions to accurately maintain alignment of said mounting plate, spacer member, circuit board and housing constituting said stationary assembly, said housing also having a reticle plate with a reticle pattern formed thereon of like alternately light transmissive and opaque equiangular sectors as said optical pattern on said disc, a light source in spaced-apart relationship with said reticle plate and an opening between said reticle plate and light source through which the periphery of said disc containing said optical pattern is rotatable; and said hub being adapted for attachment to said rotatable shaft for maintaining said disc in aligned disposition in the opening in said housing between said reticle and said light source, such that said optical pattern and reticle pattern are cooperative upon rotation of said disc relative to said reticle to produce a variable light pattern representative of the speed of said disc and in response to which said photosensors produce at least one output signal representative of the speed of said disc.

2. An electro-optical tachometer comprising:

a stationary assembly adapted for mounting around the rotatable shaft of a device the speed of which is to be monitored, said assembly including;

a mounting plate having an opening therein and fastening elements for mounting said assembly on said device;

an electrically insulative spacer member having a shape and an opening conforming to that of said mounting plate and mounted on a surface of said mounting plate;

a circuit board having a shape and an opening conforming to that of said spacer member and mounted on a surface thereof;

a plurality of photosensors disposed on a surface of said circuit board opposite to the surface confronting said spacer member and connected via conductive paths formed on said circuit board to a plurality of output terminals thereon;

said spacer member and circuit board each having aligned recessed corner portions; and a housing having first and second portions disposed on respective opposite sides of said photosensors and an outwardly extending portion spaced from said first and second portions and defining a channel, and a plurality of mounting posts attached to said mounting plate and configured to mate with said aligned recessed corner portions of said spacer member and circuit board to accurately maintain alignment of said housing, mounting plate, spacer member and circuit board constituting said stationary assembly;

a transparent disc concentrically mounted on a hub and having a plurality of alternately light transmissive and opaque equiangular sectors formed on a surface around the periphery of said disc and defining an optical pattern; and a transparent reticle plate disposed on said first and second portions of said housing and having a reticle pattern of alternately light transmissive and opaque equiangular sectors identical to the optical pattern on said disc, said reticle pattern confronting said photosensors;

a light source disposed in said outwardly extending portion of said housing and confronting said channel therein in a position to illuminate the adjacent portion of said reticle pattern and said photosensors;

said hub being adapted for attachment to said rotatable shaft for maintaining the optical pattern of said disc in aligned disposition in the channel in said housing between said reticle plate and said light source, said disc being operative upon rotation relative to said reticle plate to produce a variable light pattern by interaction of said optical pattern and said reticle pattern in response to which said photosensors produce at least one output signal representative of the speed of said disc.

3. An electro-optical tachometer according to claim 2 wherein said stationary assembly is angularly adjustable with respect to the device on which it is mounted and to an extent permitted by the fastening elements of said mounting plate to provide a skewed orientation of said reticle pattern relative to the optical pattern of said disc thereby to provide upon rotation of said disc an interference pattern having radially directed fringes sensible by said photosensors.

4. An electro-optical tachometer according to claim 3 wherein said photosensors include a pair of photosensors connected in phase opposition to provide in response to said interference pattern an output signal representative of the speed of said disc and compensated for low frequency spurious variations in said output.

5. An electro-optical tachometer according to claim 3 wherein said photosensors include two pairs of photosensors each pair being connected in phase opposition to provide in response to said interference pattern a compensated output signal representative of the speed of said disc, said pairs of photosensors being arranged in spatial phase quadrature with respect to said interference pattern to provide output signals representative of the sense of rotation of said disc.

* * * * *